United States Patent
Rosich

Patent Number: 5,224,214
Date of Patent: Jun. 29, 1993

[54] BUIFFET FOR GATHERING WRITE REQUESTS AND RESOLVING READ CONFLICTS BY MATCHING READ AND WRITE REQUESTS

[75] Inventor: Mitchell N. Rosich, Acton, Mass.

[73] Assignee: Digital Equipment Corp., Maynard, Mass.

[21] Appl. No.: 508,335

[22] Filed: Apr. 12, 1990

[51] Int. Cl.$^5$ .................................. G06F 13/14
[52] U.S. Cl. ........................ 395/250; 395/425; 395/275; 364/DIG. 1; 364/239.7; 364/252.5
[58] Field of Search .............. 395/425, 725, 250, 275

[56] References Cited

U.S. PATENT DOCUMENTS

| | | | |
|---|---|---|---|
| 4,370,710 | 1/1983 | Kroft | 395/425 |
| 4,779,193 | 10/1988 | Koga et al. | 395/425 |
| 4,805,098 | 2/1989 | Mills, Jr. et al. | 395/250 |
| 4,829,421 | 5/1989 | Ritchie | 395/250 |
| 4,831,515 | 5/1989 | Kamada et al. | 395/375 |
| 4,839,791 | 6/1989 | Ito | 395/250 |
| 4,839,796 | 6/1989 | Rorden et al. | 395/425 |
| 4,843,544 | 6/1989 | DuLac et al. | 395/250 |
| 4,851,991 | 7/1989 | Rubinfeld et al. | 395/250 |
| 5,043,868 | 8/1991 | Kitamura et al. | 395/775 |

Primary Examiner—Lawrence E. Anderson
Attorney, Agent, or Firm—Cesari and McKenna

[57] ABSTRACT

Read-write buffer apparatus is provided for reducing the time necessary to resolve read conflicts during normal and block mode read requests. Additionally, the read-write buffer apparatus provides a means for gathering non-sequential write requests in an internal write buffer, thus reducing the frequency of a buffer full condition. The enhanced read-write buffer apparatus minimizes CPU wait states, while increasing the CPU processing rate and improves overall data processing system throughput.

9 Claims, 8 Drawing Sheets

BUIFFET FOR GATHERING WRITE REQUESTS AND RESOLVING READ CONFLICTS BY MATCHING READ AND WRITE REQUESTS

FIELD OF THE INVENTION

The invention relates generally to digital data processing systems and, more specifically, to a method and apparatus for increasing the speed at which a CPU performs read and write requests to a memory subsystem.

BACKGROUND OF THE INVENTION

A typical digital data processing system comprises a number of basic units including a central processing unit (CPU), a memory unit, and an input/output (I/O) unit. The memory unit stores information in addressable storage locations. This information includes both data and instructions for processing the data. The information is transferred between the memory unit and the CPU along a bus consisting of control lines, address lines and data lines. Control request signals specify the direction of transfer. The CPU issues a read request signal to transfer information on the bus from the memory unit, interprets the information as either instructions or data, and processes the data in accordance with the instructions. The CPU then issues a write request signal to store the results in addressed locations in the memory unit.

The information transferred between the CPU and memory unit must conform with certain timing relationships that exist between the request signals and the information on the bus. Access time is defined as the time differential between the time the memory unit receives a request signal from the CPU and the time when the information is available at the memory unit. A time interval of a memory request cycle is a function of the internal clock frequency of the CPU and the access time of the memory unit. If the CPU's logic operates at a very fast clock frequency or cycle and the access time of the memory unit is slow as compared to the clock, it may take longer than a clock cycle for the CPU to access the memory unit. This is especially true for highly pipelined CPUs, such as those that are used in many reduced instruction set computers (RISCs).

A goal of RISC computer designs is to achieve an execution rate of one instruction per clock cycle. In other words, although it may take several clock cycles between the time an instruction enters the CPU pipeline to the time its execution is completed, the design goal is for the CPU to thereafter remain in a run state and process an instruction on every clock cycle. Accordingly, a new instruction must be fetched and/or a new memory access request is issued on every clock cycle. Since the memory unit is not fast enough to execute the new memory access request immediately, the CPU must enter a wait state until the request is completed, thereby affecting the processing rate of the CPU. This problem becomes particularly critical when the memory access request is a read request, since the CPU is unable to operate, that is, process data in accordance with instructions without the requested information.

A high speed cache memory is used in these situations to compensate for the time differential between the memory access time and CPU clocking logic. The cache memory's access time is closer to the operational speed of the CPU logic and thus increases the speed of data processing by providing information to the CPU at a rapid rate. The cache memory operates in accordance with the property of "locality of reference", whereby references to memory locations at any given time tend to be confined within a localized area in memory. When the CPU requires information, the cache memory is first examined. If the information is not found in the cache, the memory unit is accessed. A block mode read request is then issued by the CPU to transfer a block of information including the required information from the memory unit to the cache memory.

The I/O unit also communicates with the memory unit in order to transfer information into the data processing system and to obtain information from it. The I/O unit normally operates in accordance with control information supplied to it by the CPU. The control information defines the operation to be performed by the I/O unit. Typical devices comprising the I/O unit include printers and video display terminals, and may also include secondary storage devices such as disks or tapes.

In such a data processing system, there may be a significant degree of contention on the system bus for the memory unit as among the CPU and I/O units. As a result of contention for the memory resource, a system bus controller is provided to resolve the contention in accordance with an arbitration method. Accordingly, the CPU may be unable to retrieve information from, or store information in, the memory as fast as it may otherwise, again causing the CPU to enter a wait state which adversely affects its performance.

U.S. Pat. No. 4,805,098 describes a prior write buffer subsystem for accepting address-data pairs from a CPU and placing them in a first rank of an internal buffer having a plurality of ranks. It then issues a request to a bus controller, informing it that a data set is available for writing into main memory. When the bus is free, the controller enables the data set onto the bus and causes the write to take place. When the write is completed, the controller acknowledges its use of the information and awaits another request from the write buffer subsystem.

Here, if the write buffer subsystem receives two write commands from the CPU in sequence, both of which reference the same memory word address, the subsystem will gather these commands into a single buffer rank so that they may both be executed in a single access to main memory. In other words, gathering occurs only when the word address of an incoming write request matches the word address of the immediately preceeding write request in the buffer. Non-sequential write requests, that is, write requests stored in the internal write buffer other than the request immediately preceeding the incoming write request, are not gathered.

The prior write buffer subsystem also provides a signal useful for detecting the issuance of a memory read command to an address for which a write command is pending, i.e. a read conflict. When this signal is asserted, the CPU enters a wait state and the bus controller executes the pending write commands, i.e. flushes the buffer, in the order stored in the buffer ranks until the signal is cleared. The memory read command is then executed. Since multiple clock cycles are required to retire each write command in the buffer to main memory, and additional clock cycles are needed to execute the read request, the CPU remains in a wait state for a long period of time.

Therefore, in accordance with an aspect of the present invention, a feature is to provide a read-write buffer unit which significantly minimizes the time necessary to identify and resolve read conflicts, thereby increasing the CPU performance rate.

Additionally, a feature of the present invention is to provide a read-write buffer unit which allows the identification and resolution of read conflicts during a block mode read request.

In accordance with another aspect of the invention, a feature is to provide a read-write buffer unit which allows the gathering of non-sequential write requests in an internal write buffer, thereby reducing the number of memory accesses and improving system throughput.

SUMMARY OF THE INVENTION

The foregoing and other features of the invention are accomplished by providing a read-write buffer apparatus which significantly reduces the time necessary to resolve read conflicts for both single and block mode read requests. Additionally, the read-write buffer apparatus provides a means for gathering non-sequential write requests in an internal write buffer, thus reducing the frequency of a buffer full condition. The read-write buffer apparatus minimizes CPU wait states, while increasing the CPU processing rate and improves overall data processing system throughput.

In general, the read-write buffer apparatus enhances the performance of data processing system by receiving memory access requests from a CPU and either servicing the requests or passing the requests to a memory unit. The buffer apparatus temporarily stores write requests in an internal buffer until a system bus is available to transfer the requests to the memory unit. If the address of an incoming write request matches the address of any pending write request, the buffer unit gathers the valid data of an incoming request into the data register of the pending request.

The read-write buffer apparatus also receives read requests from the CPU and passes the requests directly to the memory unit when the system bus is available. If a read conflict arises during either a normal mode or block mode read request, the buffer unit delivers the data to the CPU from the data register of a pending request.

Other objects, features, and advantages of the invention will become apparent from a reading of the specification when taken in conjunction with the drawings in which like reference numerals refer to like elements in the several views.

DESCRIPTION OF THE PREFERRED EMBODIMENTS

Figure 1:
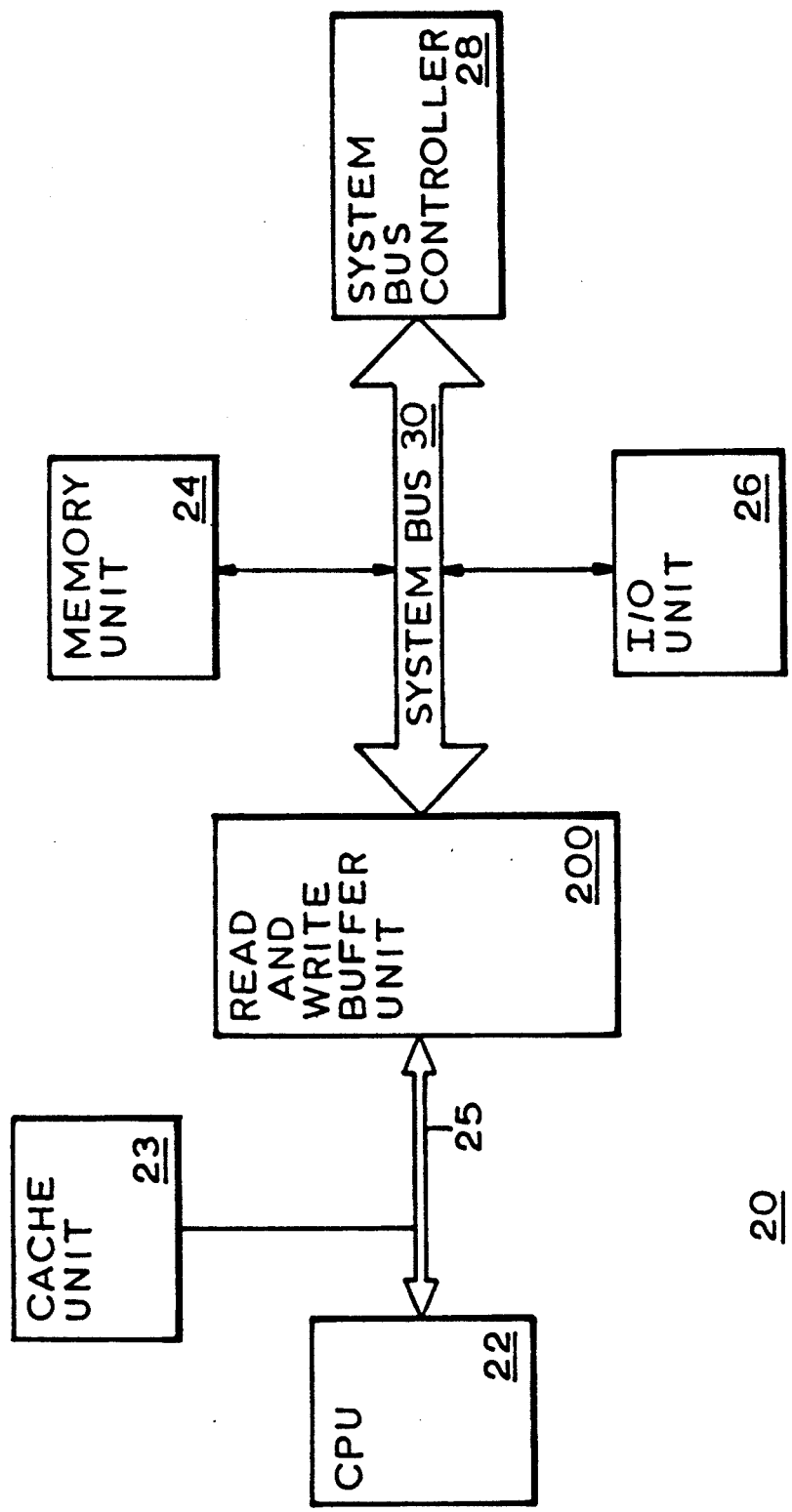
FIG. 1 shows a block diagram of a data processing system including a read-write buffer unit according to the invention.

Referring now to the drawings and particularly to FIG. 1, there is shown a block diagram of portions of a data processing system 20, the various block portions representing certain subsystems or units such as a CPU 22, a cache unit 23, a read-write buffer unit 200 according to the invention, a memory unit 24, an I/O unit 26, and a system bus controller unit 28. A CPU bus 25 having data, address and control lines couples CPU 22 to the cache unit 23 and read-write buffer unit 200, while a system bus 30 also having data, address and control lines interconnects the memory unit 24, the I/O unit 26 and the read-write buffer unit 200. Due to the possiblity for contention on system bus 30 for access to the memory unit 24, bus controller 28 is provided to resolve any contention in accordance with a predetermined arbitration method.

The I/O unit 26 transfers information into data processing system 20, where it is stored in addressable storage locations in the memory unit 24. The information may thereafter be accessed in groups of bits such as 8-bit bytes, 16-bit halfwords, 24-bit tribytes or 32-bit words. The cache unit 23 holds information that is repetitively accessed by CPU 22, preferably a highly pipelined RISC processor. However, if CPU 22 requires information that is not present in cache unit 23 or if a write operation must be performed, the CPU 22 issues an appropriate memory access request to the read-write buffer unit 200.

In accordance with the present invention, read-write buffer unit 200 enhances the performance of data processing system 20 by receiving memory access requests from CPU 22 and either servicing the requests or passing the requests to memory unit 24. As a result, CPU 22 remains in a run state instead of entering a wait state and stalling its pipeline until execution of the memory access requests are complete.

Read-write buffer unit 200 temporarily stores write requests in internal registers or ranks until the system bus 30 is available to transfer the requests to memory unit 24. A write request consists of a 32-bit address word, at least one 36-bit data word, and a 3-bit access type control word indicating whether the request is for writing a byte, halfword, tribyte or word. If the address of an incoming write request matches the address of any temporarily stored or pending write request, the buffer unit 200 merges the data of an incoming request into the data register of the pending request, thus freeing up a rank for another write request.

Read-write buffer unit 200 has a separate address and data path for read requests that allows the read requests to pass directly to the memory unit 24 when the system bus 30 is available. A read request consists of a 32-bit address word and a 3-bit access type control word indicating whether the request is for reading a byte, halfword, tribyte or word. If the address of an incoming read request matches the address of a pending write request and the pending write request has all the data required by the incoming read request, i.e. a read conflict, the buffer unit 200 delivers the data from the data register of the pending request to CPU 22. The read-write buffer unit 200 also identifies and resolves read conflicts during block mode read requests.

Figure 2:
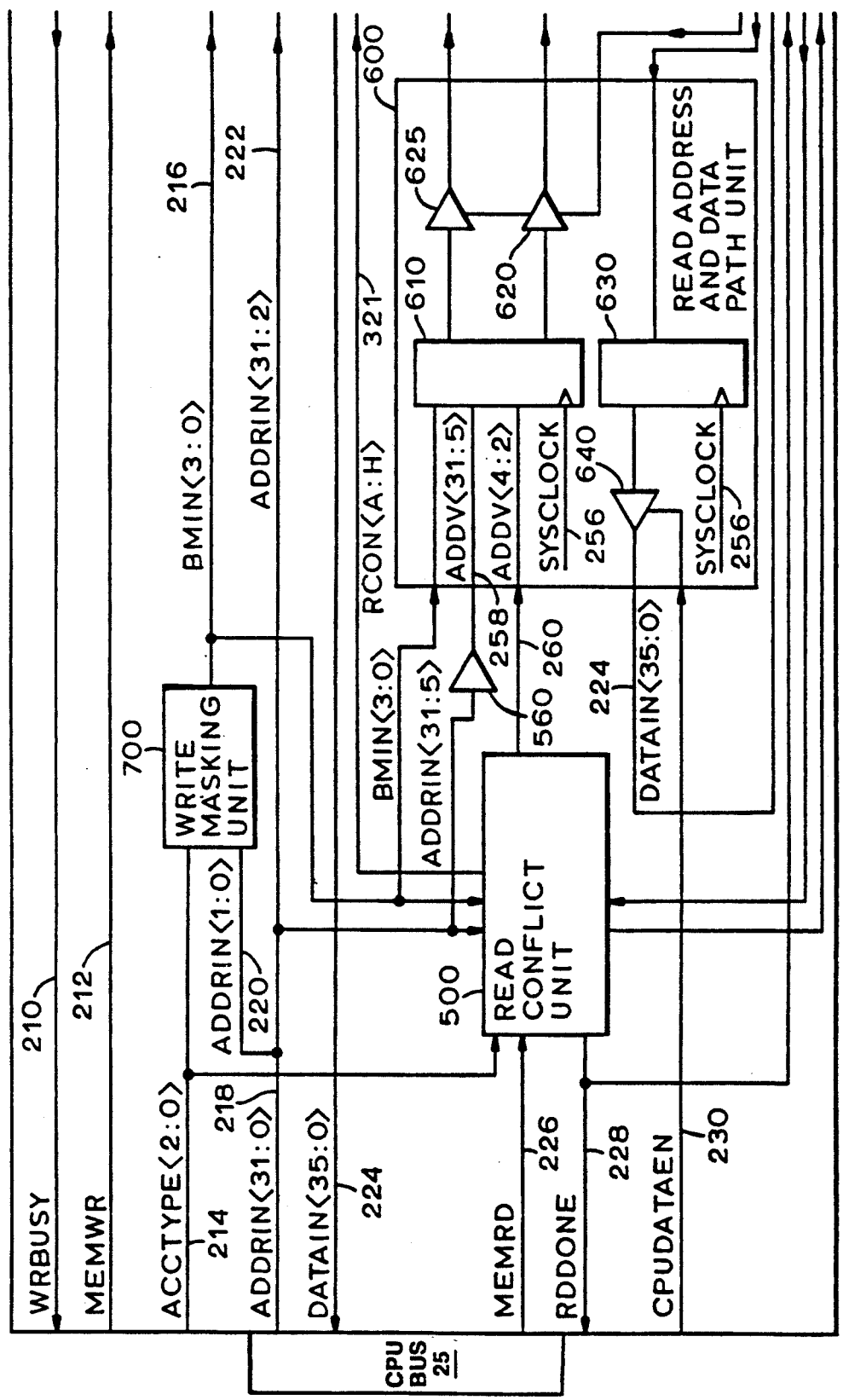
FIG. 2 shows a block diagram of an embodiment of the read-write buffer unit of FIG. 1, setting forth the signals used therein.
Figure 2:
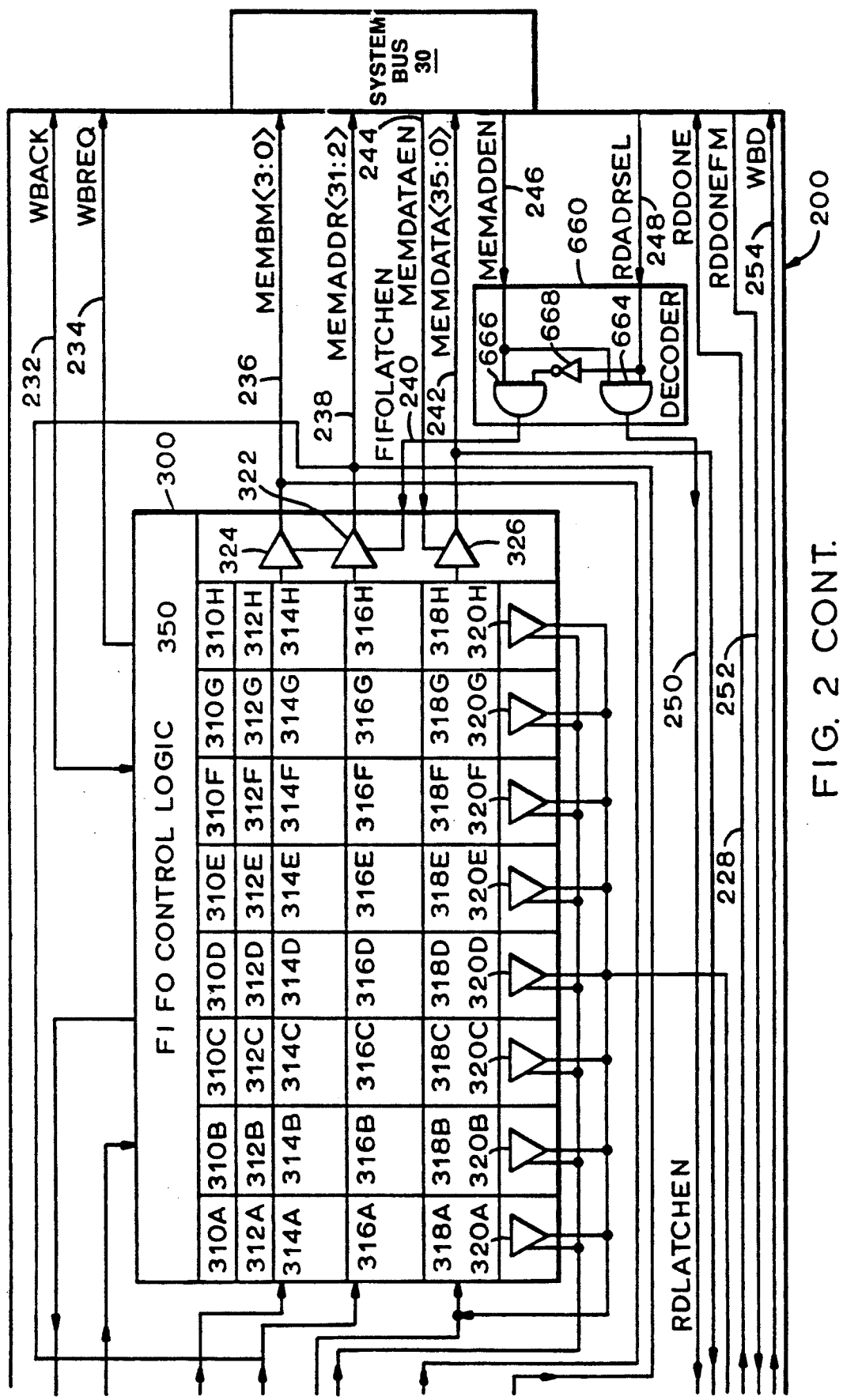

Referring also to FIG. 2, a block diagram of an embodiment of the read-write buffer unit 200 is illustrated. A write buffer 300 comprises the main address and data path for write requests in the read-write buffer unit 200. Write buffer 300 is preferably configured as a first-in first-out (FIFO) buffer, that is, the FIFO buffer 300 stores write requests in a manner such that the first request entering the FIFO buffer 300 is the first request exiting the buffer. An important feature of the FIFO buffer 300 is that it accepts write requests at the transfer rate of CPU 22 and delivers the requests to the memory unit 24 at the transfer and availability rate of system bus 30.

FIFO 300 includes control logic 350, a number of internal ranks 310 that are used to temporarily store write requests, and bus drivers 322, 324 and 326 to transfer the requests to memory unit 24. FIFO control logic 350 generates and interprets a number of control signals (WRBUSY on line 210, WBREQ on line 234, WBACK on line 232 and MEMWR on line 212) associated with the issuance of write requests from CPU 22 to memory unit 24. In a preferred embodiment of the invention, eight internal ranks 310A-H are used; however, as will become apparent herein, any number of ranks could be employed. Each rank 310 A-H consists of a data register 318, an address register 316, a byte mask register 314 and a valid bit register 312. Each data register 318 consists of four 9-bit (8 data bits plus one parity bit) registers which store a 36 bit word of data for each write request. The address register 316 stores the high order 30 bits of the address word for each write request, the byte mask register 314 stores a 4-bit code indicating which byte of data register 318 will be written to memory unit 24, and the valid register 312 stores a 1-bit flag indicating whether the pending write request is valid. The valid bits in registers 312A-H will be asserted high, indicating validity, if the pending write request has not been written to memory unit 24 or otherwise invalidated.

Each of the internal ranks 310A-H have associated therewith bus drivers 320A-H used to transfer the contents of the data registers 318A-H to CPU 22 when a read conflict occurs. Each of the bus drivers 320A-H are enabled by a signal RCON <A:H> on line 321, respectively, which will be described below in connection with FIG. 4.

A feature of the present invention involves the ability of read-write buffer unit 200 to merge or gather data bytes of non-sequential write requests having the same address. Read-write buffer unit 200 constantly compares the address of incoming memory access requests to the address of all pending write requests stored in FIFO 300. Accordingly, address comparison logic is associated with each internal rank 310A-H of FIFO 300. The structure, control and operation of FIFO 300, its internal byte gathering logic and its associated address comparison logic will be described below in connection with FIGS. 3 and 4.

Write masking unit 700 allows FIFO buffer 300 to implement byte gathering on non-sequential write requests within the FIFO 300. That is, write masking unit 700 provides a means for accessing and overwriting individual 8-bit bytes (one of four possibilities), 16-bit halfwords (one of three possibilities), 24-bit tribytes (one of two possibilities), or 32-bit words of data stored in the data ranks 318 of FIFO 300 with valid data of an incoming write request (see Table 1). The incoming data is valid if it is intended to overwrite data in memory unit 24.

Access type control signals ACCTYPE <2:0> on line 214 and lower order address signals ADDRIN <1:0> on line 220 are used by the masking unit 700 to generate a series of byte mask signals BMIN <3:0> on line 216 that identify data bytes to be overwritten during the write masking operation. The encoding of these signals, according to a preferred embodiment of the invention, is as follows:

TABLE 1

| MODE | ACCTYPE <2:0> | | | ADDRIN <1:0> | | BMIN <3:0> | | | |
|---|---|---|---|---|---|---|---|---|---|
| Word | 0 | 1 | 1 | x | x | 1 | 1 | 1 | 1 |
| Tribyte | 0 | 1 | 0 | 0 | 0 | 0 | 1 | 1 | 1 |
| Tribyte | 0 | 1 | 0 | 0 | 1 | 1 | 1 | 1 | 0 |
| Halfword | 0 | 0 | 1 | 0 | 0 | 0 | 0 | 1 | 1 |
| Halfword | 0 | 0 | 1 | 0 | 1 | 0 | 1 | 1 | 0 |
| Halfword | 0 | 0 | 1 | 1 | 0 | 1 | 1 | 0 | 0 |
| Byte | 0 | 0 | 0 | 0 | 0 | 0 | 0 | 0 | 1 |
| Byte | 0 | 0 | 0 | 0 | 1 | 0 | 0 | 1 | 0 |
| Byte | 0 | 0 | 0 | 1 | 0 | 0 | 1 | 0 | 0 |
| Byte | 0 | 0 | 0 | 1 | 1 | 1 | 0 | 0 | 0 |
| Blck Mode | 1 | x | x | x | x | 1 | 1 | 1 | 1 |

It will be understood to those skilled in the art that the encoded signals listed above can be used to implement logic required for the write masking unit 700. BMIN <3:0> are stored in the byte mask rank 314 of internal ranks 310 in FIFO 300 and are used to identify, in conjunction with the valid bit in rank 312, the valid bytes of data in each pending write request.

As an example, if the incoming memory access request is a byte write request to data byte 2 of a certain word address and a pending write request in rank E of FIFO 300 was a halfword write request to data bytes 1 and 2 of the same word address, the two requests will be merged to a two-byte write request and the results stored in rank E. The data byte 2 will be data contributed by the incoming write request and the data byte 1 will be data contributed by the request pending in rank E. Therefore, in accordance with an advantage of the invention, the incoming request does not occupy one of the available ranks 310 within FIFO 300, thus allowing the CPU 22 to continue issuing write requests without filling another rank 310 within the buffer 300. Additionally, a separate write request to memory unit 24 is eliminated, thus making system bus 30 available for servicing other units within data processing system 20. The byte masking feature of the present invention also provides a means for accessing and overwriting any combination of one or more bytes in a data word in the memory unit 24.

Decoder 660 receives control signals from the bus controller 28 and generates driver enable signals for the read and write address paths of buffer unit 200. Decoder 660 includes first and second dual-input AND gates 664, 666 and an inverter 668 configured in the following manner. AND gate 664 receives two signals, MEMADDEN on line 246 and RDADRSEL on line 248, at its inputs from bus controller 28. The output of gate 664 is coupled to the enable input of a driver 620 located in read address and data path unit 600. When MEMADDEN and RDADRSEL are both asserted high, AND gate 664 generates RDLATCHEN on line 250 to enable driver 620. Gate 666 is a two-input AND gate with the output of an inverter 668 coupled to one of its inputs. RDADRSEL is tied to the input of inverter 668, while MEMADDEN is connected to the other input. The output of gate 666 is coupled to the enable input of a driver 322 in FIFO 300. When MEMADDEN is asserted high and RDADRSEL is not asserted low, AND gate 666 generates FIFOLATCHEN on line 240 to enable driver 322.

A read address and data path buffer 600 provides the address and data path for read requests from CPU 22 to memory unit 24 within read-write buffer unit 200. A read request consisting of ADDV <4:2> on line 260 from read conflict unit 500 and ADDV <31:5> on line 258 from CPU 22 and BMIN <3:0> on line 216 from write masking unit 700 is loaded into an address latch 610 on the leading edge of a CPU-provided clock signal SYSCLOCK on line 256, and thereafter delivered to memory unit 24 when driver 620 is enabled by RDLATCHEN. The corresponding data is returned by the memory unit 24 to MEMDATA <35:0> on line 242 and loaded into a data latch 630 by SYSCLOCK on line 256 (all SYSCLOCKs will be described as being on line 256). The data word is then delivered to CPU 22 via driver 640 over DATAIN <35:0> line 224 when a data enable signal CPUDATAEN on line 230 is provided by CPU 22.

If the address of read request issued by CPU 22 matches the address of a pending write request in FIFO buffer 300, a read conflict occurs. If read-write buffer unit 200 passes the read request to the memory unit 24 prior to executing or retiring the pending write request, then the data returned by the memory unit 24 will be stale. Previously, in order to ensure that stale data was not read, the read request was delayed while the pending write requests in FIFO 300 were retired to the memory unit. The read request was then executed. Depending upon the number of write requests needing execution, the CPU 22 could be in a wait state for many clock cycles, causing the CPU pipeline to stall and stop data processing.

In accordance with the teachings of the present invention, a read conflict unit 500 provides the logic necessary to identify and resolve the read conflict within the read-write buffer unit 200. When the address comparison logic of buffer unit 200 identifies a match and a read request signal MEMRD on line 226 is provided by CPU 22, the data associated with the pending write request is transmitted to CPU 22 from FIFO 300 on DATAIN <35:0> on line 224 to CPU bus 25 within the memory request cycle of CPU 22. Therefore, the read request is not delayed and, in fact, does not have to be transferred to the memory unit 24. The CPU 22 does not have to enter a wait state, its pipeline is not stalled and data processing is not affected. A control signal RDDONE on line 228 is generated by read conflict unit 500, and sent to CPU 22 and memory unit 24 to inform them of the conflict and its resolution.

A read conflict may also occur during a block mode read request. A block mode read request is issued by CPU 22 to update the contents of cache unit 23. A block mode read request involves the transmission of data to cache unit 23 from a predetermined number of address locations in memory unit 24. If any of the addresses of a block mode read request matches an address of a pending write request in FIFO buffer 300, a block mode read conflict occurs.

Read conflict unit 500 also provides the logic necessary to identify and resolve block mode read conflicts within FIFO 300. When CPU 22 issues MEMRD and ACCTYPE <2> is asserted, a block mode read request is in progress. The size of the block mode read request is predetermined; in a preferred embodiment of the present invention, the size is eight consecutive address locations. When the address comparison logic of buffer unit 200 identifies a match between any of the consecutive block mode read addresses and a pending write request, the data associated with the pending write request is transmitted to CPU 22 from FIFO 300 on DATAIN <35:0> to CPU bus 25 within the memory request cycle of CPU 22 as described above. An embodiment of the read conflict unit 500 is described below in connection with FIG. 5.

Referring back to FIG. 2, a preferred embodiment of FIFO buffer 300 including the control logic necessary to perform byte gathering is illustrated. An example of a FIFO buffer which may be used in the invention is a MMI 67401 device, described in the 1988 IDT Data Book Catalog on page 14-2, published by Integrated Device Technology, of Santa Clara, Calif. The FIFO buffer 300 according to the invention incorporates the basic internal rank structure and control logic of the MMI 67401 device, including the generation and use of associated valid bits, and modifies the applicable control logic to perform byte gathering.

As mentioned, FIFO control logic 350 generates and interprets a number of control signals associated with the issuance of write requests from CPU 22 to memory unit 24. A write request is loaded into FIFO 300 when a write control signal MEMWR is provided by CPU 22 on line 212. Initially, the write request passes through the internal rank 310A to rank 310H. As more write requests are issued by CPU 22 and received by FIFO 300, the ranks 310G-A are loaded. When all the ranks 310 are loaded, a buffer full signal WRBUSY, which is a buffered version of valid bit A located in register 312A, is provided by the FIFO control logic 350 on line 210 to CPU 22. A write buffer request signal WBREQ, asserted by control logic 350, is likewise a buffered version of the valid bit H located in register 312H which informs bus controller 28 over line 234 that a valid write request is pending in FIFO 300. A write buffer acknowledge signal WBACK is provided over line 232 by the memory unit 24 to control logic 350 to acknowledge receipt of a write request.

When CPU 22 issues a write request to read-write buffer unit 200, the request is loaded into rank A of FIFO 300. If no other write requests are pending in the FIFO buffer 300, the write request passes through each internal rank 310 to the last rank H. When the write request reaches rank H, the WBREQ signal is asserted to inform the system bus controller 28 that a write request is pending. If the system bus 30 is not available, WBREQ remains asserted until the bus 30 is free. If the system bus 30 is available, the write request is delivered to memory unit 24 in the following manner. The high order address bits in rank 316H and the four-bit code located in byte mask rank 314H are driven to MEMADDR <31:2> on line 238 and MEMBM <3:0> on line 236 via drivers 322 and 324, respectively, when the signal FIFOLATCHEN is asserted by bus controller 28. Concurrently, the data word located in data rank 318 is driven onto bus lines MEMDATA <35:0> when driver 326 is enabled by MEMDATAEN on line 244, which is also provided by bus controller 28. The bus controller 28 responds with WBACK on line 232 to acknowledge receipt of the transmitted write request.

If write requests are pending in the FIFO buffer 300 when an incoming memory access request is received by read-write buffer unit 200, the address of the incoming request is compared to the address of the pending requests stored in ranks 310A-H in accordance with the ranks, associated address comparison logic.

Figure 4:
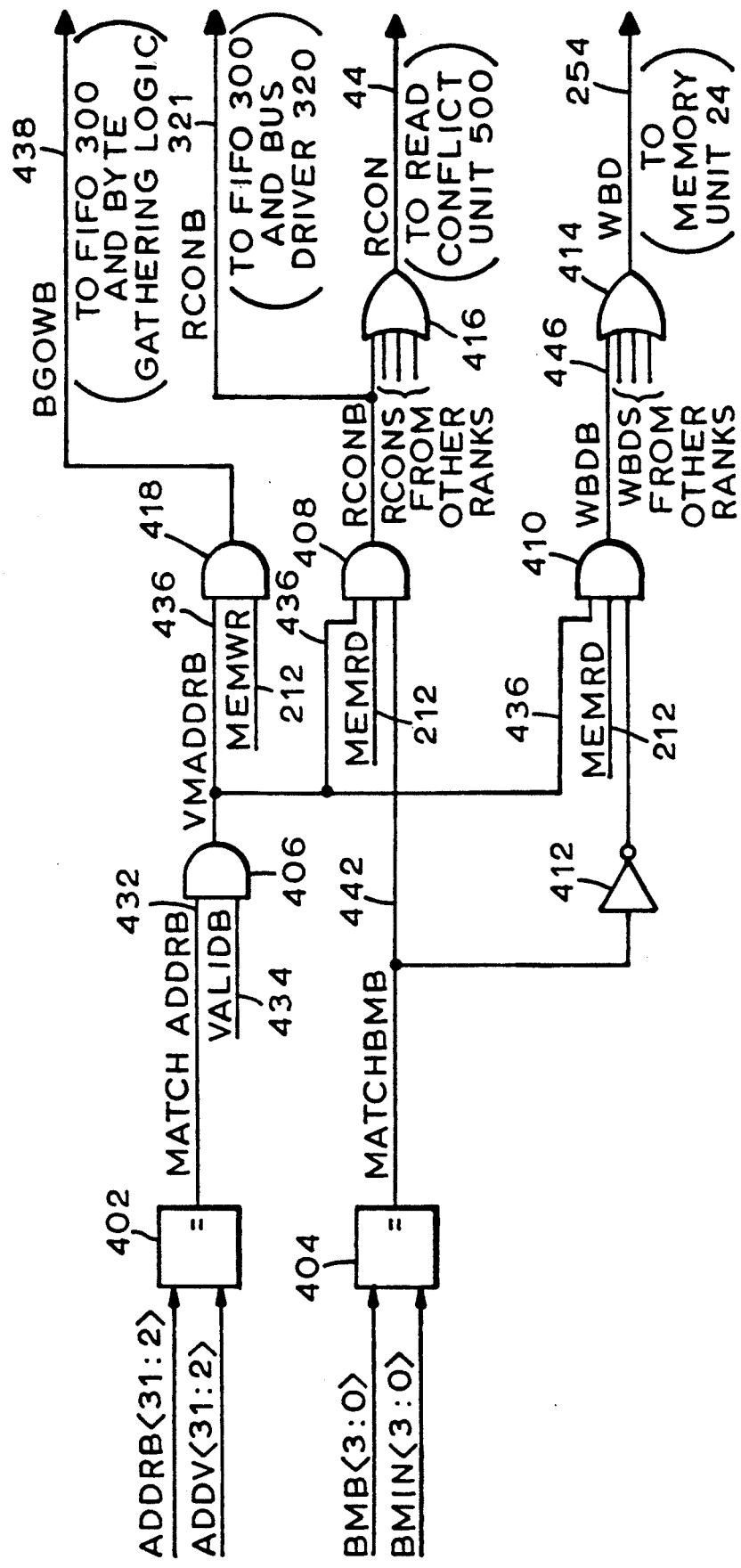
FIG. 4 depicts a circuit diagram of address comparison logic used in accordance with the present invention.

Turning to FIG. 4, an example of the address comparison logic associated with rank 310B of FIFO 300 is illustrated. It is to be understood that similar logic is provided for the other ranks 310. Comparator 402 compares the high order address bits ADDRB <31:2> of the write request address word stored in rank B to the high order address bits ADDV <31:2> of the incoming memory request address word. ADDV <31:2> represents a buffered version of ADDRIN <31:2>. If there is no match and the memory request is a write, the incoming write request is loaded into rank 310A of FIFO 300, where it then passes to the last available rank. If there is no match and the memory request is a read, the read request is passed immediately to the read address and data path unit 600. If there is a match, a signal MATCHADDRB on line 432 is asserted from comparator 402.

MATCHADDRB is coupled to one input of a two-input AND gate 406, while the signal VALIDB on line 434 is coupled to the other input. VALIDB, when asserted by FIFO control logic 350, indicates that the write request in rank B is valid, that is, it has not yet been written to memory or otherwise invalidated. When MATCHADDRB and VALIDB are both asserted high, the signal VMADDRB on line 436 is generated. VMADDRB is then coupled, along with MEMWR on line 212, to the inputs of a two-input AND gate 418. When VMADDRB and MEMWR are both asserted high, the signal BGOWB on line 438 is provided at the output of AND gate 418 which is tied to FIFO 300. The assertion of BGOWB indicates that byte gathering may be performed on a write request.

Comparator 404 compares the four-bit byte mask code BMB <3:0> of the write request stored in rank B to the four-bit byte mask code BMIN <3:0> from write masking unit 700 of the incoming memory request. If there is a match, a signal MATCHBMB on line 442 is asserted high. MATCHBMB is coupled to one input of a three-input AND gate 408, while VMADDRB and MEMRD are coupled to the other inputs. When MATCHBMB, VMADDRB and MEMRD, indicating a read request, are all asserted high, the signal RCONB is generated at the output of gate 408. The assertion of RCONB over line 321 enables the appropriate bus driver 320B in rank 310B of FIFO 300 (see FIG. 2), which then dumps or delivers the contents of data register 318B on DATAIN <35:0> to CPU 22. RCONB is tied to OR gate 416 together with similar RCONs from address comparison logic associated with the other internal ranks 310. The assertion of RCON on line 444 at the output of OR gate 416 indicates that a read conflict has occurred.

If comparator 404 determines there is no match between BMB <3:0> and BMIN <3:0>, MATCHBMB is not asserted or is low. An inverter 412, coupled to one input of a three-input AND gate 410, inverts the non-asserted MATCHBMB signal. Coupled to the other inputs of gate 410 are VMADDRB and MEMRD. When MEMRD and VMADDRB are asserted high, WBDB is provided on line 446 at the output of AND gate 410. WBDB is tied to OR gate 414 together with similar WBDs from address comparison logic associated with the other internal ranks 310. The assertion of WBD on line 254 (see FIG. 2) indicates to memory unit 24 that not all of the data bytes required by CPU 22 for the incoming read request are present in the FIFO 300. This situation, which occurs infrequently, causes CPU 22 to enter a wait state while the pending write requests in FIFO 300 are retired to memory unit 24. Therafter, the incoming read request is passed to read address and data path unit 600 and then to memory unit 24 for execution. When the data is returned, CPU 22 can begin processing the requested data.

Referring again to FIG. 2, when an address match occurs during a write request, resulting in the assertion of BGOW, it was stated that the incoming request may be gathered into the rank with the matching request. In accordance with the principles of the invention, any valid byte of the incoming data may be gathered or merged with corresponding bytes on every pending request in the buffer ranks 310 except for the request in ranks A and H, the first and last ranks. In other words, if only one write request is pending in the FIFO buffer 300 at rank H when the incoming write request is received, byte-gathering is not performed and the incoming request is loaded into the first rank A and passes through to the next to last available rank G. Byte gathering cannot be performed on the request in rank H because synchronization between the read-write buffer unit 200 and system bus 30 could result in the data of the incoming request being lost. Byte gathering also cannot be performed on the request in rank A because, as explained below, WRBUSY will be asserted and CPU 22 will be stalled.

If BGOW is asserted and rank A is the only available buffer rank in FIFO 300, the following situations may occur. If the bus controller 28 is already acting on the request stored in rank H, the incoming request will be loaded into rank A (or gathered with a pending request stored in the ranks as described below). If the bus controller 28 is not already acting on the request stored in rank H, but the address of the incoming request matches one of the pending requests, the new request will be gathered with the pending request as described below. WRBUSY will be signalled on line 210 for one clock cycle due to the time required to detect the match. If the bus controller 28 is not already acting on the request stored in rank H and the address of the incoming request does not match that of pending request in the ranks 310, the new request will be loaded and stored in rank A and WRBUSY will be signalled. If WRBUSY is active when the CPU 22 has a write request ready, the CPU 22 enters a wait state until WRBUSY clears. Therefore, when WRBUSY is asserted on line 210, it is impossible to gather write requests in rank 310A.

When BGOW is otherwise asserted, byte gathering is performed in accordance with the invention. Byte gathering logic is associated with each of the internal ranks 310 of FIFO 300, except for ranks A and H shown in FIG. 3C.

Figure 3A:
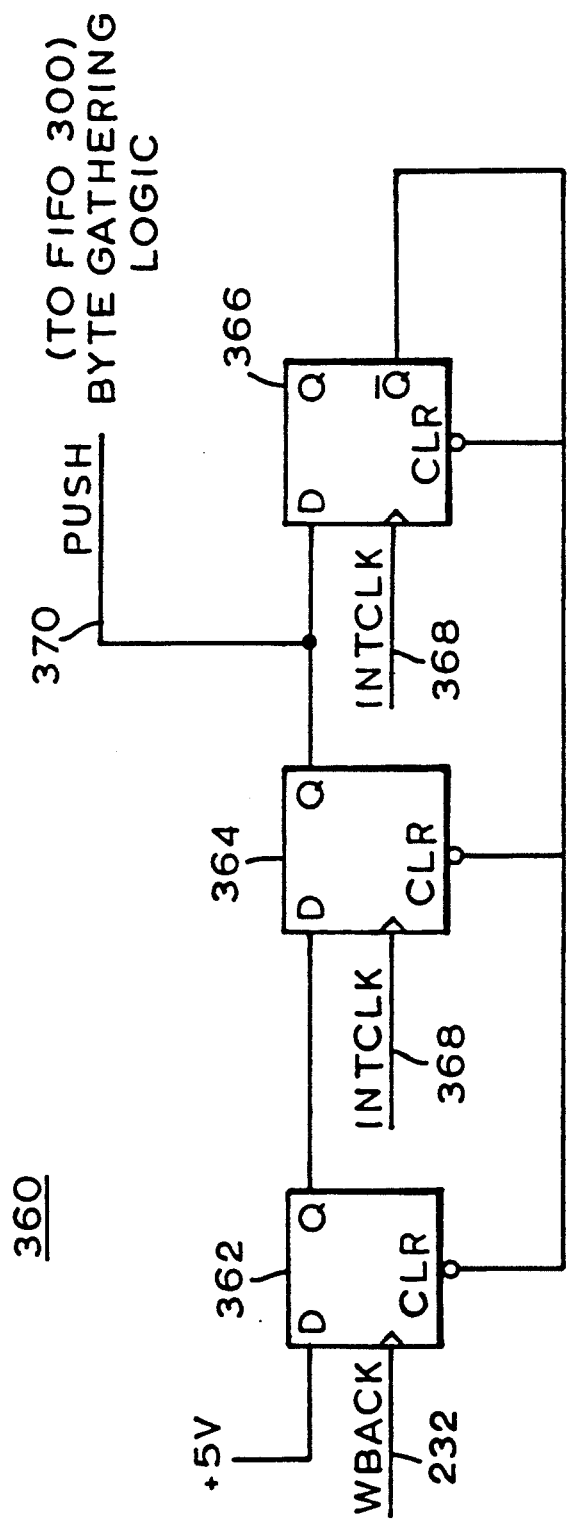
FIGS. 3A, 3B & C are diagrams illustrating the structure and organization of a FIFO buffer including byte-gathering logic in accordance with the embodiment of FIG. 2.
Figure 3B:
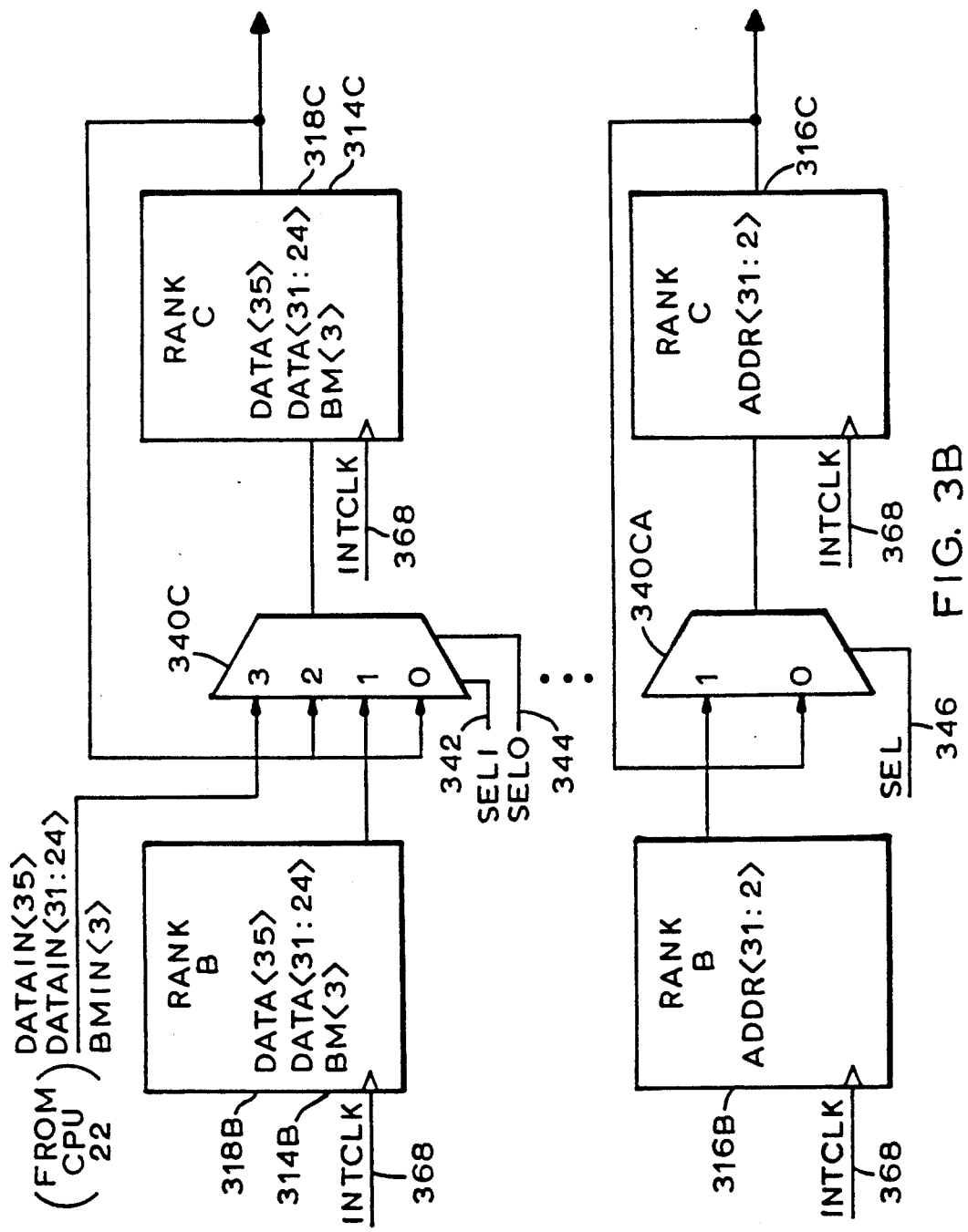
Figure 3C:
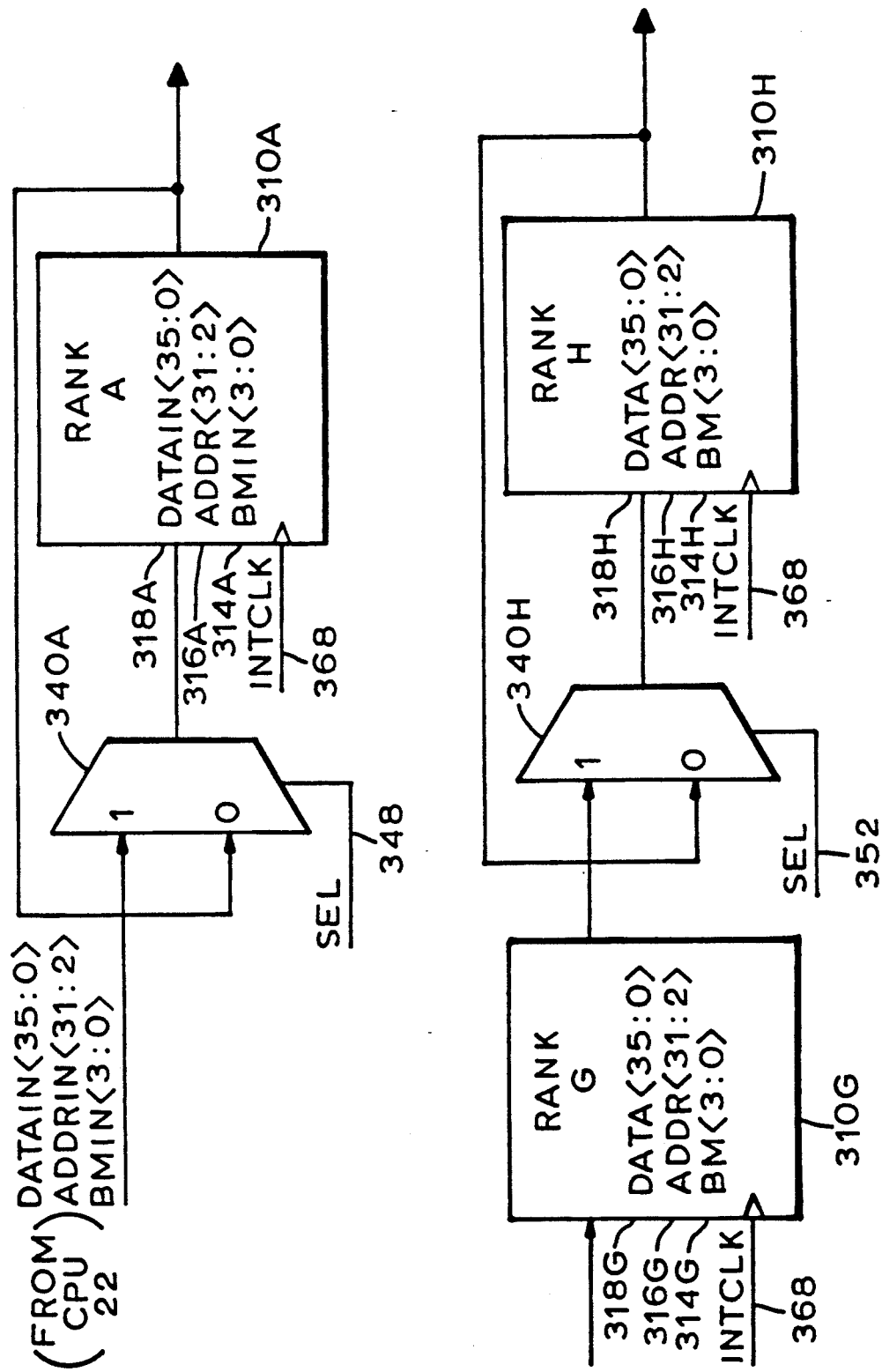

FIGS. 3A, 3B and 3C depict the apparatus which modifies the applicable control logic of the basic FIFO structure. FIG. 3A shows a synchronizing circuit 360 used to permit pending write requests to move or fall-through exactly one rank 310 in the FIFO 300 when a write request is retired to the memory unit 24. Synchronizing circuit 360 is located within FIFO control logic 350 and provides the timing required to synchronize the internal operation of FIFO buffer 300 to the external read-write buffer unit 200.

Synchronizing circuit 360 includes a state device 362 having a data input tied to +5 v and a clocking input enabled by the WBACK signal on line 232. State devices 364 and 366 are arranged in a dual-rank synchronizer configuration. The output Q of device 362 is directly coupled to the data input of state device 364, while the clocking input of device 364 is enabled by INTCLK on line 368, a high speed clock internal to the FIFO buffer. The output Q of state device 364, labelled PUSH on line 370, is used in conjunction with the byte gathering control logic described below. PUSH is also directly coupled to the data input of state device 366, while the clocking input of device 366 is enabled by INTCLK. The inverted Q output of device 366 is then tied to the inverted clearing input of each state device. In a preferred embodiment of synchronizing circuit 360, the state devices are D-type flip-flops.

Operationally, when WBACK is provided by bus controller 28, indicating the retirement of a write request from FIFO 300 to memory unit 24, the Q output of device 362 is asserted high. On the next rising edge of INTCLK, which operates at a higher frequency than the CPU 22 SYSCLOCK, the signal PUSH is asserted high, which, as will be explained below, initiates the "falling-through" operation of FIFO 300. On the next rising edge of INTCLK, since PUSH is asserted, the inverted Q output of device 366 will clear each state device 362, 364 and 366. The devices will remain cleared until WBACK clears and asserts again, thereby preventing the continual "falling-through" of write requests pending in FIFO 300 when the requests are not being retired.

Referring now to FIG. 3B, there is shown the data, byte mask and address registers, and control logic associated with ranks B–G. Although rank C (and B) will be used as an example to describe the byte gathering apparatus and operation according to the principles of the present invention, it is to be understood that the apparatus and principles apply to all the ranks B–G in FIFO 300. FIG. 3C shows the data, byte mask and address registers, and control logic associated with ranks A and H. Selectors 340A–H are provided for each 9-bit data register (or 36-bit data register) 318, each byte mask register 314 and each 30-bit address register 316 of ranks 310.

In FIG. 3B, selector 340C, which represents the control logic associated with the data and byte mask bits of rank C, is a 4-input multiplexer. In this example, byte 3 of data register 318B,C and byte mask bit <3> of byte mask register 314B,C will be described. A similar circuit is provided for each of the bytes <2:0> of data register 318B,C and each of the byte mask bits <2:0> of byte mask register 314B,C. Likewise, it is to be understood that such similar circuits are provided for each of the bytes <3:0> of data registers 318 and each of the byte mask bits <3:0> of byte mask registers 314 in FIFO 300, except for the data and byte mask registers of ranks A and H.

Registers 318C, 314C (and 318B, 314B) are clocked by INTCLK on line 368 and include a 9-bit register storing byte 3 of the data word and a parity bit, and a 1-bit register storing the byte mask bit for byte 3, respectively. The input of registers 318B, 314B are tied to the output of a selector (not shown) associated with registers 318B, 314B and the output of registers 318B, 314B are coupled to input 1 of selector 340C. Byte 3 of the incoming data word (together with its parity bit and byte mask bit) are coupled to input 3 of selector 340C. The output of selector 340C is tied to the input of registers 318C, 314C and the output of registers 318C, 314C are fed back to inputs 0 and 2 of selector 340C. SEL0 on line 342 and SEL1 on line 344 are coupled to the select inputs of selector 340C.

Selector 340CA, which represents the control logic associated with the address word of register 316C, is a 2-input multiplexer. Address register 316C (and 316B) are 30-bit registers storing the address word for the write request located in rank C (and B) and are clocked by INTCLK on line 368. The input of register 316B is tied to the output of a selector (not shown) associated with register 316B and the output of register 316B is coupled to input 1 of selector 340CA. The output of selector 340CA is tied to the input of register 316C and the output of register 316C is fed back to input 0 of selector 340CA. SEL on line 346 is coupled to the select input of selector 340CA.

SEL0 and SEL1 determine which input of multiplexer 340C will be selected in a manner such that SEL0 is the least significant bit (LSB) and SEL1 is the most significant bit (MSB), while SEL determines which input of multiplexer 340CA will be selected. A total of seven signals are utilized in the following three boolean equations to determine the selection process. The encoding of these signals, according to a preferred embodiment of the invention, is as follows:

TABLE 2

| Row # | VALID C | MEMWR | WBACK | BGOW C | BMIN <n> | BGOW B | PUSH | SELECTOR |
|---|---|---|---|---|---|---|---|---|
| #1 | 0 | x | x | x | x | x | x | 1 |
| #2 | 1 | 0 | 0 | x | x | x | x | 0 |
| #3 | 1 | 1 | 0 | 0 | x | x | x | 2 |
| #4 | 1 | 1 | 0 | 1 | 0 | x | x | 2 |
| #5 | 1 | 1 | 0 | 1 | 1 | x | x | 3 |
| #6 | 1 | x | 1 | x | x | 0 | 1 | 1 |
| #7 | 1 | x | 1 | x | 0 | 1 | 1 | 1 |
| #8 | 1 | x | 1 | x | 1 | 1 | 1 | 3 |
| #9 | 1 | x | 1 | x | x | 0 | 0 | 0 |
| #10 | 1 | x | 1 | x | 0 | 1 | 0 | 0 |
| #11 | 1 | x | 1 | x | 1 | 1 | 0 | 2 |

The encoded signals are used in the following boolean equations to determine the selection process:

$$\text{SEL1} = (\text{VALIDC} \cdot \text{MEMWR} \cdot \overline{\text{WBACK}}) + \text{rows } \#3,4,5$$

$$(\text{VALIDC} \cdot \text{WBACK} \cdot \text{BMIN}<n> \cdot \overline{\text{BGOWB}})$$
rows #8,11

$$\text{SEL0} = \overline{\text{VALIDC}} + (\text{VALIDC} \cdot \overline{\text{WBACK}} \cdot \text{PUSH}) +$$
row #1     rows #6,7,8

$$(\text{VALIDC} \cdot \text{MEMWR} \cdot \overline{\text{WBACK}} \cdot \text{VGOWC} \cdot \text{BMIN}<n>)$$
row #5

$$\text{SEL} = \overline{\text{VALIDC}} + (\text{VALIDC} \cdot \overline{\text{WBACK}} \cdot \text{PUSH})$$

Operationally, there are three objectives or states that the selectors 340 associated with ranks B–G accomplish at any time: (i) get data from the previous ranks or "fall-through"; (ii) get data from the incoming write request or "byte-gather"; or (iii) maintain the state of data currently in the ranks or "steady-state". It will be understood to those skilled in the art that the encoded signals and equations listed above can be used to implement logic required for the fall-through, byte-gathering and steady state objectives or selections within FIFO 300.

As an example, if VALIDC was not asserted or zero, indicating that the write request pending in rank 310C was invalid (or non-existent), then according to the equations above for selector 340C, SEL0 would be asserted and SEL1 would not be asserted, and input 1 of selector 340C would be selected. This corresponds to the "fall-through" state and the contents of rank B would fall-through to rank C. Row #1 of the boolean table reflects this condition.

As another example, assume the write request pending in rank C is valid (VALIDC asserted) and WBACK is asserted, indicating that a write request in rank H has been retired to memory unit 24. If PUSH, from the control logic 350, is thereafter also asserted, then the write request within the rank B will fall-through to the next rank C, and the request within rank C will fall-through to the next rank D, and so on. However, if BGOWB is also asserted, indicating an address match between an incoming write request and the write request in rank B, and BMIN <3> is asserted high, indicating a valid data byte 3 from the incoming write request, then even though the write request in rank B is falling-through to rank C, byte gathering will be performed on rank C. According to the above equations, SEL0 would be asserted and SEL1 would be asserted, and input 3 of selector 340C would be selected. DATAIN <31:24>, DATAIN <35> (parity bit) and BMIN <3> would overwrite the corresponding data, parity and byte mask bits in rank C. Row #8 of table 2 reflects this condition.

In conjunction with the above example, SEL, according to the equation listed above, would be asserted since VALIDC, WBACK and PUSH are all provided. Therefore, selector 340CA would select input 1 and the address word in rank B will fall-through to rank C.

Referring now to FIG. 3C, selector 340A represents the control logic associated with the 30-bit address register 316A, the 36-bit data register 318A and the 4-bit byte mask register 314A of rank A, which is clocked by INTCLK on line 368. Selector 340A is a 2-input multiplexer having SEL on line 348 coupled to its select input that determines which input will be selected. The input of rank A is tied to the output of selector 340A and the output of rank A is fedback to input 0 of selector 340A. Input 1 of selector 340A is directly coupled to DATAIN <35:0> and ADDRIN <31:2> to CPU bus 25. Input 1 is also tied to BMIN <3:0> from write masking unit 700.

Also in FIG. 3C, selector 340H represents the control logic associated with the 30-bit address register 316H, the 36-bit data register 318H and the 4-bit byte mask register 314H of rank H, which is clocked by INTCLK on line 368. Selector 340H is a 2-input multiplexer having SEL on line 352 coupled to its select input that determines which input will be selected. The input of rank H is tied to the output of selector 340H and the output of rank H is fed back to input 0 of selector 340H. Input 1 of selector 340H is directly coupled to the data 318G, address 316G, and byte mask 314G registers of rank G.

The encoded signals listed in Table 2 above are used in the following boolean equations to determine the multiplexer selection process:

$$SEL = \overline{VALIDx} + (VALIDx \cdot WBACK \cdot PUSH)$$

where x is either A or H depending upon the rank 310 in FIFO 300. Again, it will be understood to those skilled in the art that the encoded signals and equations listed above can be used to implement logic required for the objectives or selections within FIFO 300.

Figure 5:
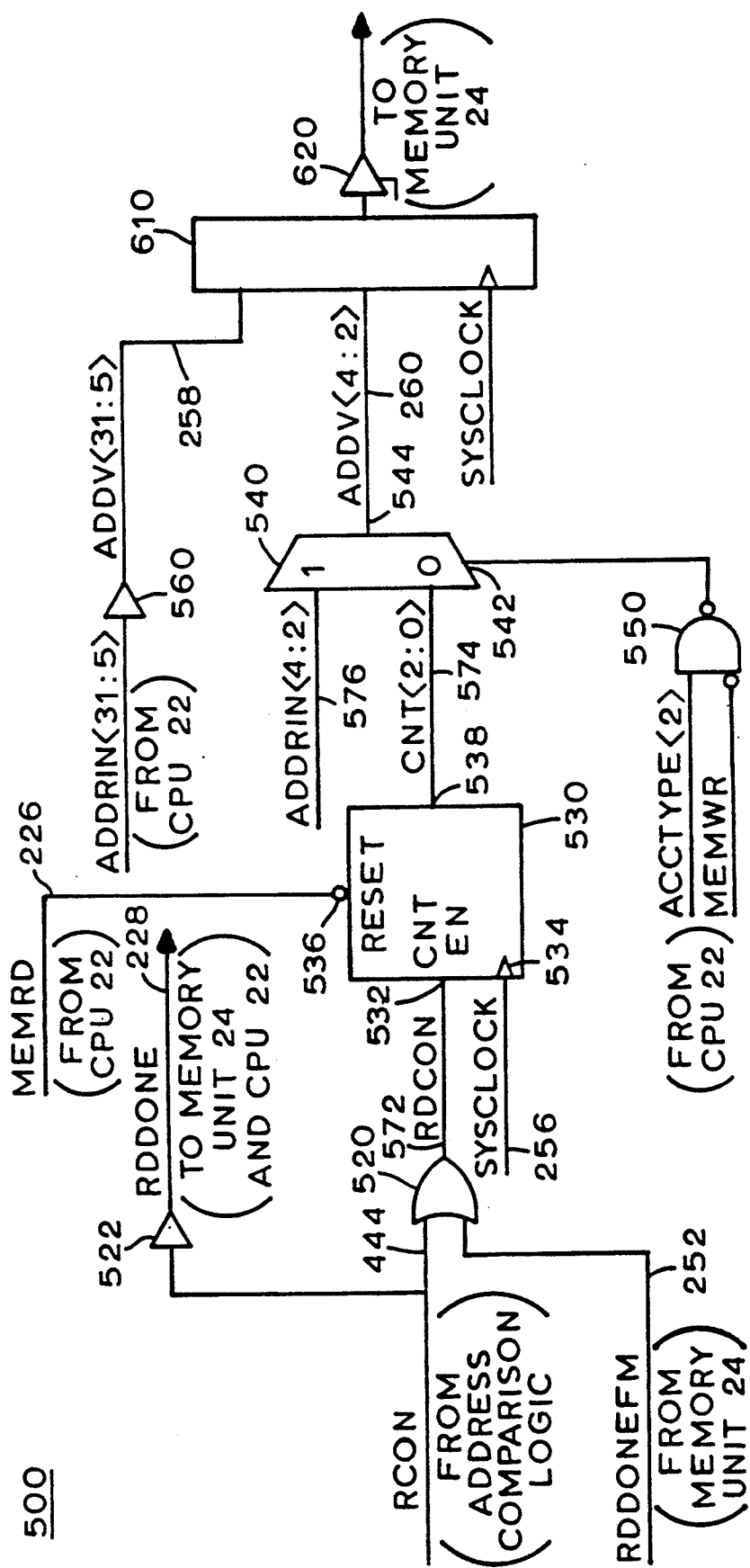
FIG. 5 illustrates a block diagram of the read conflict unit in accordance with the embodiment of FIG. 2.

FIG. 5 depicts a circuit schematic of a preferred embodiment of the read conflict unit 500 in accordance with invention. As described in connection with the address comparison logic, the signal RCON on line 444, when asserted, indicates that a read conflict has occured. A RDDONE signal on line 228 is provided to memory unit 24, notifying it that a read conflict has occurred and has been resolved within the FIFO 300. RDDONE is also sent to CPU 22 to notify it that the read data is available on DATAIN <35:0>. The RDDONE signal is a buffered version of RCON and generated by buffer circuit 522.

The signal RCON is coupled to a two-input OR gate 520. A signal RDDONEFM is coupled to the other input, the RDDONEFM signal being asserted by memory unit 24 on line 252 (see FIG. 2) and indicating that the read request was serviced. If either RCON or RDDONEFM are asserted high, a signal RDCON on line 572 is generated at the output of OR gate 520. RDCON is directly coupled to a counter enable input 532 of N-bit counter 530. In a preferred embodiment of the present invention, counter 530 is an 3-bit counter capable of incrementing eight consecutive addresses. MEMRD on line 226 is coupled to the reset input 536, while SYSCLOCK on line 256 is tied to the clock input 534. When MEMRD is not asserted, the counter 530 is reset to zero and is thereafter incremented when MEMRD, RDCON and SYSCLOCK are provided. The output 538, labelled CNT <2:0> on line 574, of counter 530 is directly tied to input 0 of a two-input multiplexer 540, while address bits ADDRIN <4:2> on line 576 are coupled to the other input 1.

Coupled to the select input 542 of multiplexer 540 is the output of a two-input NAND gate 550. ACCTYPE <2> is tied to one input of NAND gate 550, while MEMWR is tied to the other inverted input. The output 544 of multiplexer 540, labelled ADDV <4:2> on line 260 (see FIG. 2), is merged with the high order address bits ADDV <31:5> and latched into address latch 610 by SYSCLOCK to produce the appropriate address word within a normal mode or block mode read request. ADDV <31:5> on line 258 (see FIG. 2) is a buffered version of the high order incoming address word ADDRIN <31:5>, that is, ADDV <31:5> is generated at the output of buffer circuit 560 when ADDRIN <31:5> is presented at the input of circuit 560.

The operation of read conflict unit 500 is as follows. When RCON is provided by the appropriate address comparison logic and MEMRD is provided by CPU 22, a read conflict has occurred. The conflict is resolved by delivering the appropriate data to CPU 22 in accordance with the operation of FIFO 300 as illustrated in FIG. 3. RDCON then enables the counter 530 when clocked by SYSCLOCK; however, since MEMRD is asserted, NAND gate 550 selects input 0 of multiplexer 540 and ADDRIN <4:2> becomes ADDV <4:2>. ADDV <31:5> is merged with ADDV <4:2>, loaded into read latch 610 on the next rising edge of SYSCLOCK, and thereafter transmitted to memory unit 24 via driver 620 when requested by bus controller 28. Read conflict unit 500 informs the bus controller 28 and memory unit 24 of the conflict and its resolution by providing RDDONE. If the read request was to a single address, MEMRD is then cleared indicating the completion of the read request.

If the request was a block mode read request and RDCON is provided (indicating a read conflict), then counter 530 is reset to zero. Since ACCTYPE <2> is asserted for block mode read requests and MEMWR is cleared, NAND gate 550 selects input 1 of multiplexer 540 and CNTR <2:0> becomes ADDV <4:2>. ADDV <31:5> is merged with ADDV <4:2> and delivered to memory unit 24 as described above.

This time, however, ADDV <31:2> is also fed back to address comparison logic and the next address within the block mode read request is compared. If a match occurs, a read conflict arises and the request is resolved within the FIFO 300. Since MEMRD is still asserted, the counter 530 increments to the next address within the block mode read, and the procedure is repeated until the block mode read is completed.

If a match of ADDV <31:2> and pending address words ADDRx <31:2> in FIFO 300 does not occur, then that particular read request within the block mode read is executed by the memory unit 24. Upon completion of that particular request, the signal RDDONEFM is asserted by the memory unit 24. RDDONEFM, which is coupled to one of the inputs of OR gate 520, then generates RDCON and the counter 530 continues to increment until the block mode read request completes.

In summary, the read-write buffer unit 200 in accordance with the present invention enhances the performance of data processing system 20 by receiving memory access requests from CPU 22 and either servicing the requests or passing the requests to memory unit 24. The buffer unit 200 temporarily stores write requests in internal FIFO buffer 300 until the system bus 30 is available to transfer the requests to memory unit 24. If the address of an incoming write request matches the address of any pending write request, the buffer unit 200 gathers the valid data of an incoming request into the data register of the pending request, thus freeing up a rank for another write request.

Read-write buffer unit 200 also receives read requests from CPU 22 and passes the requests directly to the memory unit 24 when the system bus 30 is available. If a read conflict arises during either a normal mode or block mode read request, the buffer unit 200 delivers the data from the data register of the pending request to CPU 22. As a result, the performance rate of CPU 22 increases and the overall throughput of data processing system 20 is improved.

While there has been shown and described a preferred embodiment, it is to be understood that various other adaptations and modifications may be made within the spirit and scope of the present invention. It will therefore be apparent to those skilled in the art that various changes and modifications in the specifically described embodiments can be carried out without departing from the scope of the invention which is to be limited only by the scope of the appended claims.

I claim:

1. Apparatus for receiving incoming read and write memory access requests from a CPU and passing the incoming memory access requests to a memory unit via a bus, each incoming read request having an address word and a control word for obtaining data from said memory unit and each incoming write request having an address word, a control word and at least one data word for overwriting data in said memory unit, said apparatus having an internal buffer for sequentially storing a plurality of incoming write requests when the address word of the incoming write request does not match an address word of one of the plurality of stored write requests, said apparatus further having a separate buffer for passing an incoming read request to said memory unit when the address word of the incoming read request does not match the address word of any of the plurality of stored write requests, said internal buffer having more than two ranks for write requests, said apparatus comprising:

means for generating a byte mask code for each plurality of stored write requests and for each incoming memory access request;

means, coupled to said generating means, for comparing the address word and byte mask code of each incoming memory access request with the address word and byte mask code of each stored write request;

means, coupled to said comparing means, for gathering at least one data word of an incoming write request into a data word of one of the stored write requests when the address word of the incoming write request matches the address word of one of the stored write requests to thereby enable gathering of non-sequential write requests; and means, coupled to said comparing means, for delivering the data word of a stored write request to said CPU directly from said internal buffer without using the bus between said internal buffer and said memory unit when the address word and byte mask code of an incoming read request match the address word and byte mask code of that stored write request.

2. The apparatus of claim 1 wherein said comparing means further includes means for determining whether the incoming memory request is one of a write request and a read request.

3. The apparatus of claim 1 wherein one of the stored write requests includes all of the stored write requests except for the write requests located in the first and last ranks of said internal buffer.

4. The apparatus of claim 1 wherein a stored write request includes any of the stored write requests located in said internal buffer ranks.

5. For a read-write buffer unit, a method for receiving incoming read and write memory access requests from a CPU and passing the incoming memory access requests to a memory unit via a bus, each incoming read requests having an address word and a control word for obtaining data from said memory unit and each incoming write request having an address word, a control word and at least one data word for overwriting data in said memory unit, said buffer unit having an internal buffer for sequentially storing a plurality of incoming write requests when the address word of the incoming write request does not match an address word of one of the plurality of stored write requests said internal buffer having more than two ranks for storing write requests, said buffer unit further having a separate buffer for passing an incoming read request to said memory unit when the address word of the incoming read request does not match the address word of any of the stored write requests, said method comprising the steps of:

generating a byte mask code for each stored write request and for each incoming memory request;

comparing the address word and byte mask code of each incoming memory request with the address word and byte mask code of each stored write request;

gathering the data word of an incoming write request into a data word of one of the stored write requests when the address word of the incoming write request matches the address word of one of the stored write requests to thereby enable gathering of non-sequential write requests; and delivering the data word of a stored write request to said CPU directly from said internal buffer without using the bus between said internal buffer and said memory unit when the address word and byte mask code of an incoming read request match the address word and byte mask code of that stored write request.

6. The method of claim 5 wherein said comparing step further includes the step of determining whether the incoming memory request is one of a write request and a read request.

7. Apparatus for receiving an incoming memory access request from a CPU and passing the incoming memory access request to an output device via a bus said apparatus comprising:

a write buffer unit having a first rank, a last rank and a plurality of internal ranks for sequentially storing more than two write requests, each write request having an address word, a control word, at least one data word for overwriting data in said output device;

a read data path unit for passing a read request to said output device, each incoming read request having an address word and a control word for obtaining data from said output device;

a byte masking unit, coupled to said write buffer unit and said read data path unit, for generating an encoded byte mask code for each incoming memory access request and for each write request stored in said ranks of said write buffer;

comparision logic circuitry, coupled to said byte masking unit, for determining whether the incoming memory request is one of a write request and a read request, and for comparing the address word and byte mask code of the incoming memory access request with the address word and byte mask code of each stored write request;

means, coupled to said comparison logic, for gathering at least one data word of the incoming memory request into a data word of one of the stored write requests of the plurality of internal ranks when the incoming memory request is an incoming write request and when the address word of the incoming write request matches the address word of one of the stored write requests to thereby enable gathering of non-consecutive write requests;

means, coupled to said comparison logic, for passing the incoming memory request to said read data path unit when the incoming memory request is a read request and when the address word of the read request does not match the address word of any of the stored write requests located in said first, said last or said plurality of internal ranks of said write buffer unit; and means, coupled to said comparison logic, for delivering at least one data word of a stored write request to said CPU directly from said internal buffer without using the bus between said write buffer unit and said output device when the incoming memory request is a read request, and when the address word and byte mask code of the read request match the address word and byte mask code of that stored write request.

8. The apparatus of claim 7 further comprising means, coupled to said comparison logic, for storing the incoming memory request in said first rank of said write buffer when the incoming memory request is a write request and the address word of the write request does not match an address word of one of the stored write requests of said plurality of internal ranks.

9. The apparatus of claim 8 wherein said encoded byte mask code is generated from the control word and from portions of the address word of the memory request.

* * * * *